(12) United States Patent
Sakamoto

(10) Patent No.: US 12,435,207 B2
(45) Date of Patent: Oct. 7, 2025

(54) CARBON MATERIAL COMPOSITION

(71) Applicant: Sekisui Chemical Co., Ltd., Osaka (JP)

(72) Inventor: Ryou Sakamoto, Yamaguchi (JP)

(73) Assignee: SEKISUI CHEMICAL CO., LTD, Osaka (JP)

( * ) Notice: Subject to any disclaimer, the term of this patent is extended or adjusted under 35 U.S.C. 154(b) by 0 days.

(21) Appl. No.: 18/703,828

(22) PCT Filed: Oct. 26, 2022

(86) PCT No.: PCT/JP2022/039891
§ 371 (c)(1),
(2) Date: Apr. 23, 2024

(87) PCT Pub. No.: WO2023/074730
PCT Pub. Date: May 4, 2023

(65) Prior Publication Data
US 2024/0417543 A1    Dec. 19, 2024

(30) Foreign Application Priority Data

Oct. 27, 2021    (JP) ................. 2021-175783

(51) Int. Cl.
*C08K 7/06* (2006.01)
*H01M 4/62* (2006.01)

(52) U.S. Cl.
CPC ............ *C08K 7/06* (2013.01); *H01M 4/625* (2013.01); *C08K 2201/001* (2013.01)

(58) Field of Classification Search
CPC .... C08K 7/06; C08K 2201/001; C08K 3/041; C08K 3/04; C08K 2201/004; H01M 4/625; H01M 4/62; C08J 5/042; C08J 2329/14; H01B 1/24; Y02E 60/10; C08L 29/14
See application file for complete search history.

(56) References Cited

U.S. PATENT DOCUMENTS

| | | | |
|---|---|---|---|
| 10,297,741 | B1 | 5/2019 | Benedict et al. |
| 2010/0330358 | A1 | 12/2010 | Hashimoto |
| 2011/0155205 | A1* | 6/2011 | Steuer .................. C08F 8/48 525/61 |
| 2018/0269485 | A1 | 9/2018 | Yoo et al. |
| 2020/0377690 | A1 | 12/2020 | Ootsuki et al. |
| 2022/0186017 | A1 | 6/2022 | Maeda |

FOREIGN PATENT DOCUMENTS

| | | | |
|---|---|---|---|
| CN | 108586836 | 9/2018 | |
| JP | 6-166765 | 6/1994 | |
| JP | 2001-49013 | 2/2001 | |
| JP | 2014-225446 | 12/2014 | |
| JP | 2018-535284 | 11/2018 | |
| WO | 2009/098779 | 8/2009 | |
| WO | WO-2017148972 A1 * | 9/2017 | |
| WO | WO-2017174684 A1 * | 10/2017 | ....... B32B 17/10761 |
| WO | 2019/163841 | 8/2019 | |
| WO | 2020/203786 | 10/2020 | |

OTHER PUBLICATIONS

International Search Report issued Jan. 17, 2023 in International (PCT) Application No. PCT/JP2022/039891.

* cited by examiner

*Primary Examiner* — Mark Kopec
*Assistant Examiner* — Jaison P Thomas

(57) ABSTRACT

The present invention provides a carbon material composition excellent in the dispersibility of a fibrous carbon material and capable of reducing electrode resistance. Provided is a carbon material composition containing: a fibrous carbon material; a water-based solvent; and a polyvinyl acetal resin, the polyvinyl acetal resin having an acetal group content of 40.0 mol % or less and a blockiness of hydrophobic groups measured by NMR of 0.35 or greater and 0.80 or less.

5 Claims, No Drawings

CARBON MATERIAL COMPOSITION

TECHNICAL FIELD

The present invention relates to a carbon material composition excellent in the dispersibility of a fibrous carbon material and capable of reducing electrode resistance.

BACKGROUND ART

Fibrous carbon materials such as carbon nanotubes and VGCFs exhibit excellent electrical properties. They have been expected to find practical applications in various fields, including the electronics field. For example, research has been made on adding fibrous carbon materials as conductive aids to secondary battery electrodes or transparent electrodes.

Fibrous carbon materials are typically used in the form of a composition in which a fibrous carbon material is dispersed in water or an organic solvent.

However, fibrous carbon materials cannot maintain a stable dispersion state in a solvent due to their low solubility and low dispersibility. Moreover, although fibrous carbon materials have excellent electrical, thermal, and mechanical properties, they easily tangle due to their significantly high aspect ratio, making it difficult to produce a high-performance composite material that fully utilizes their properties.

In response to such an issue, Patent Literature 1 discloses that a carbon nanotube dispersion containing carbon nanotube bundles, a dispersion medium, and a polyvinyl butyral resin having a weight average molecular weight greater than 50,000 can enhance the carbon nanotube dispersibility.

Even such a dispersion, however, may not have a sufficient dispersibility-enhancing effect, and may not sufficiently enhance conduction properties.

CITATION LIST

Patent Literature

Patent Literature 1: JP 2018-535284 T

SUMMARY OF INVENTION

Technical Problem

The present invention aims to provide a carbon material composition excellent in the dispersibility of a fibrous carbon material and capable of reducing electrode resistance.

Solution to Problem

The present disclosure (1) relates to a carbon material composition containing: a fibrous carbon material; a water-based solvent; and a polyvinyl acetal resin, the polyvinyl acetal resin having an acetal group content of 40.0 mol % or less and a blockiness of hydrophobic groups measured by NMR of 0.35 or greater and 0.80 or less.

The present disclosure (2) relates to the carbon material composition of the present disclosure (1), wherein the polyvinyl acetal resin is an acetalized product of a polyvinyl alcohol resin having a degree of saponification of 70.0 mol % or greater and 99.9 mol % or less.

The present disclosure (3) relates to the carbon material composition of the present disclosure (1) or (2), wherein the polyvinyl acetal resin has an average degree of polymerization of 200 or greater and 4,000 or less.

The present disclosure (4) relates to the carbon material composition of any one of the present disclosures (1) to (3), wherein the polyvinyl acetal resin has an acetal group content of 5.0 mol % or more.

The present disclosure (5) relates to the carbon material composition of any one of the present disclosures (1) to (4), which has a ratio of an amount of the fibrous carbon material, an average fiber diameter of the fibrous carbon material, and an amount of the polyvinyl acetal resin (amount of polyvinyl acetal resin/(average fiber diameter of fibrous carbon material/amount of fibrous carbon material)) of 0.01 or greater and 7.00 or less.

The present invention is described in detail below.

As a result of extensive studies, the present inventors have found out that the combined use of a fibrous carbon material, a water-based solvent, and a polyvinyl acetal resin having specific properties can provide a carbon material composition excellent in the dispersibility of the fibrous carbon material and capable of reducing electrode resistance. The inventors thus completed the present invention.

The carbon material composition of the present invention contains a fibrous carbon material.

With the fibrous carbon material contained, the electrical conduction properties can be enhanced.

Examples of the fibrous carbon material include carbon fibers and carbon nanotubes.

Example of the carbon fibers include PAN carbon fibers, pitch carbon fibers, cellulose carbon fibers, and vapor-grown carbon fibers (VGCFs).

The carbon nanotube is a tubular carbon material. Examples thereof include single-walled carbon nanotubes and multi-walled carbon nanotubes.

The fibrous carbon material preferably has an average fiber diameter of 0.40 nm or greater, more preferably 0.50 nm or greater, while preferably 200.0 nm or less, more preferably 150.0 nm or less.

The average fiber diameter can be measured by Raman spectroscopy (Raman), for example.

The fibrous carbon material preferably has an average fiber length of 0.10 µm or greater, more preferably 0.50 µm or greater, while preferably 25.0 µm or less, more preferably 20.0 µm or less.

The average fiber length can be measured by Raman spectroscopy (Raman), for example.

The fibrous carbon material preferably has a specific gravity of 1.0 or greater, more preferably 1.3 or greater, while preferably 2.5 or less, more preferably 2.3 or less.

The specific gravity can be measured using an electronic densimeter, for example.

The fibrous carbon material preferably has an aspect ratio (average fiber length/average fiber diameter) of 50 or greater, more preferably 80 or greater, while preferably 5,000 or less, more preferably 4,000 or less.

The fibrous carbon material preferably has a specific surface area of 8 $m^2/g$ or greater, more preferably 13 $m^2/g$ or greater, while preferably 1,500 $m^2/g$ or less, more preferably 1,200 $m^2/g$ or less.

The specific surface area can be measured using a specific surface area measuring device (available from Shimadzu Corporation, ASAP-2000), for example.

When the fibrous carbon material is a carbon nanotube, the carbon nanotube preferably has 15 or fewer layers. The lower limit of the number of layers is not limited but is preferably one or greater.

The number of layers can be determined with a transmission electron microscope (TEM), for example.

The fibrous carbon material preferably has a ratio of the G band intensity to the D band intensity (G/D ratio) of 60 or less. The lower limit thereof is not limited but is preferably 0.4 or greater.

The G/D ratio can be measured by Raman spectroscopy, for example.

The amount of the fibrous carbon material in the carbon material composition of the present invention is preferably 0.05% by weight or more, more preferably 0.10% by weight or more, while preferably 10.0% by weight or less, more preferably 7.0% by weight or less.

The carbon material composition of the present invention contains a water-based solvent.

Examples of the water-based solvent include water and solvent mixtures of water and a hydrophilic solvent.

Specific examples include water and solvent mixtures of water and a hydrophilic solvent such as ethyl alcohol or isopropyl alcohol.

When the water-based solvent is a solvent mixture of water and a hydrophilic solvent, the amount of water in the solvent mixture is preferably 50% by weight or more, more preferably 70% by weight or more, while preferably 90% by weight or less.

The amount of the water-based solvent in the carbon material composition of the present invention is preferably 60.0% by weight or more, more preferably 70.0% by weight or more, while preferably 99.9% by weight or less.

The carbon material composition of the present invention contains a polyvinyl acetal resin.

The polyvinyl acetal resin has an acetal group content of 40.0 mol % or less and a blockiness of hydrophobic groups measured by NMR of 0.35 or greater and 0.80 or less.

With the polyvinyl acetal resin contained, the dispersibility of the fibrous carbon material can be enhanced, resulting in an excellent surface resistance value and excellent average surface roughness of the sheet to be obtained.

The polyvinyl acetal resin preferably includes at least an acetal group-containing structural unit represented by the following formula (1-1), a hydroxy group-containing structural unit represented by the following formula (1-2), and an acetyl group-containing structural unit represented by the following formula (1-3).

[Chem. 1]

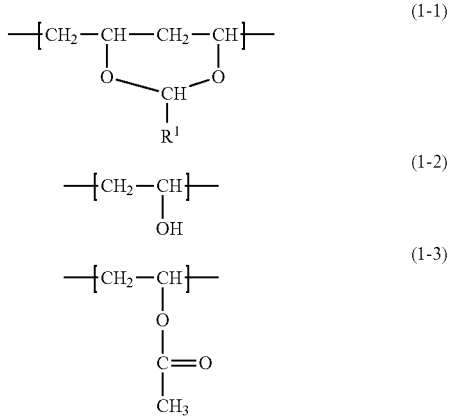

In the formula (1-1), $R^1$ represents a hydrogen atom or a C1-C20 alkyl group.

When $R^1$ in the formula (1-1) is a C1-C20 alkyl group, examples of the alkyl group include methyl, ethyl, n-propyl, isopropyl, n-butyl, iso-butyl, sec-butyl, tert-butyl, pentyl, hexyl, heptyl, 2-ethylhexyl, octyl, nonyl, decyl, undecyl, dodecyl, tridecyl, tetradecyl, pentadecyl, and octadecyl groups. Preferred among these are methyl and n-propyl groups.

In the polyvinyl acetal resin, the amount of the acetal group-containing structural unit represented by the formula (1-1) (hereinafter also referred to as an acetal group content) is 40.0 mol % or less.

With an acetal group content of 40.0 mol % or less, the dispersibility of the fibrous carbon material can be sufficiently increased. As a result, the sheet to be obtained can have an excellent surface resistance value and excellent average surface roughness.

The acetal group content is preferably 5.0 mol % or more, more preferably 7.0 mol % or more, while preferably 35.0 mol % or less.

The acetal group content herein is calculated by counting acetalized two hydroxy groups because an acetal group of a polyvinyl acetal resin is obtained by acetalizing two hydroxy groups.

The acetal group content can be measured by NMR, for example.

In the polyvinyl acetal resin, the amount of the hydroxy group-containing structural unit represented by the formula (1-2) (hereinafter also referred to as a hydroxy group content) is preferably 40.0 mol % or more, more preferably 50.0 mol % or more, while preferably 94.9 mol % or less, more preferably 90.0 mol % or less.

The hydroxy group content within the range allows the polyvinyl acetal resin to be easily soluble in the water-based solvent, which advantageously leads to even better dispersibility of the fibrous carbon material.

The hydroxy group content can be measured by NMR, for example.

In the polyvinyl acetal resin, the amount of the acetyl group-containing structural unit represented by the formula (1-3) (hereinafter also referred to as an acetyl group content) is preferably 0.1 mol % or more, more preferably 5.0 mol % or more, while preferably 30.0 mol % or less, more preferably 25.0 mol % or less.

The acetyl group content within the range can advantageously suppress an increase in viscosity.

The acetyl group content can be measured by NMR, for example.

The polyvinyl acetal resin has a blockiness of hydrophobic groups measured by NMR of 0.35 or greater and 0.80 or less.

With the blockiness of hydrophobic groups within the range, the dispersibility of the fibrous carbon material can be sufficiently increased. As a result, the sheet to be obtained can have an excellent surface resistance value and excellent average surface roughness.

The blockiness of hydrophobic groups is preferably 0.35 or greater, more preferably 0.40 or greater, while preferably 0.80 or less, more preferably 0.75 or less.

The blockiness of hydrophobic groups can be determined from the ratio of the peak intensity around 4.8 ppm to the sum of the peak intensity around 5.1 ppm and the peak intensity around 4.8 ppm (peak intensity around 4.8 ppm/[(peak intensity around 5.1 ppm)+ (peak intensity around 4.8 ppm)]), where the peak intensities are measured by NMR.

The peak intensity around 4.8 ppm indicates the degree of blockiness of hydrophobic groups. The peak intensity around 5.1 ppm indicates the degree of randomness of hydrophobic groups. The NMR measurement can be performed by the method described in Example later. The hydrophobic groups herein mean acetyl groups.

The blockiness of hydrophobic groups can be controlled by selecting a raw material polyvinyl alcohol resin, for example. Specifically, for example, a polyvinyl alcohol resin having a hydroxy group half width of 340 cm$^{-1}$ or greater and 380 cm$^{-1}$ or less is preferably used. The greater the hydroxy group half width, the greater the blockiness of hydroxy groups and thus the greater the blockiness of hydrophobic groups of the resulting polyvinyl acetal resin tends to be. The hydroxy group half width is more preferably 345 cm$^{-1}$ or greater and 375 cm$^{-1}$ or less.

The hydroxy group half width of the polyvinyl alcohol resin can be determined by measuring, by IR measurement, the peak width of a peak around 3, 500 cm$^{-1}$ at ½ of the peak height. The IR measurement is measurement of an absorption spectrum by infrared absorption spectroscopy, and can be performed using an IR measurement device, for example.

The polyvinyl acetal resin may include a structural unit containing an acid-modified group.

Examples of the acid-modified group include a carboxy group, a sulfonic acid group, a maleic acid group, a sulfinic acid group, a sulfenic acid group, a phosphoric acid group, a phosphonic acid group, an amino group, an amide group, and their salts. Preferred among these are a carboxy group, a sulfonic acid group, and an amide group.

When the modified polyvinyl acetal resin includes the structural unit containing an acid-modified group, the polyvinyl acetal resin can have enhanced compatibility with an epoxy resin and achieve high mechanical strength.

The structural unit containing an acid-modified group may have a structure in which an acid-modified group as a side chain is directly bonded to a carbon atom constituting the main chain or a structure in which an acid-modified group is bonded to a carbon atom constituting the main chain via an alkylene group.

The structural unit containing an acid-modified group may have a steric structure in which two acid-modified groups are bonded to the same carbon atom constituting the main chain or a steric structure in which one acid-modified group is bonded to a carbon atom constituting the main chain. Alternatively, the structural unit containing an acid-modified group may have a steric structure in which one acid-modified group is bonded to each of two adjacent carbon atoms constituting the main chain or a steric structure in which an acid-modified group is bonded to only one of two adjacent carbon atoms constituting the main chain. Preferred is a steric structure in which two acid-modified groups are bonded to the same carbon atom constituting the main chain or a steric structure in which one acid-modified group is bonded to each of two adjacent carbon atoms constituting the main chain. More preferred is a steric structure in which two acid-modified groups are bonded to the same carbon atom constituting the main chain, because such a structure increases the steric hindrance and thereby widens the network structure of a cured product obtainable by combining the polyvinyl acetal resin and an epoxy resin, and as a result can enhance the flexibility of the cured product to be obtained.

The structural unit containing an acid-modified group may have a steric structure in which acid-modified groups are bonded to carbon atoms constituting the main chain on one side of the chain (isotactic arrangement) or a steric structure in which acid-modified groups are bonded to carbon atoms constituting the main chain on alternate sides of the chain (syndiotactic arrangement). The structural unit may have a steric structure in which the acid-modified groups are randomly bonded (atactic arrangement).

In the case where the structural unit containing an acid-modified group has a structure in which an acid-modified group is bonded to a carbon atom constituting the main chain via an alkylene group, the alkylene group is preferably a C1-C10 alkylene group, more preferably a C1-C5 alkylene group, still more preferably a C1-C3 alkylene group.

In the polyvinyl acetal resin, the amount of the structural unit containing an acid-modified group is preferably 0.1 mol % or more, more preferably 0.5 mol % or more, while preferably 5 mol % or less, more preferably 3 mol % or less.

The amount of the structural unit containing an acid-modified group means the percentage of the structural unit containing an acid-modified group relative to the total amount of structural units constituting the polyvinyl acetal resin. The amount of the structural unit containing an acid-modified group can be measured by NMR, for example.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

When the acid-modified group is a carboxy group, examples of a structural unit containing a carboxy group include a structural unit represented by the following formula (2-1), a structural unit represented by the following formula (2-2), and a structural unit represented by the following formula (2-3).

[Chem. 2]

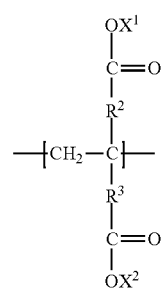
(2-1)

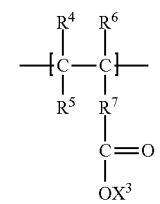
(2-2)

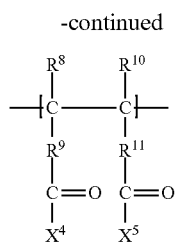

(2-3)

In the formula (2-1), $R^2$ and $R^3$ each independently represent a C0-C10 alkylene group, and $X^1$ and $X^2$ each independently represent a hydrogen atom, a metal atom, or a methyl group.

In the formula (2-1), the lower limit of the carbon number of each of the alkylene groups represented by $R^2$ and $R^3$ is preferably 0, and the upper limit thereof is preferably 5. The lower limit is more preferably 1, and the upper limit is more preferably 3.

$R^2$ and $R^3$ may be the same as or different from each other and are preferably different from each other. Preferably, at least either $R^2$ or $R^3$ is a single bond.

Examples of the C0-C10 alkylene group include linear alkylene groups such as a single bond and methylene, ethylene, trimethylene, tetramethylene, pentamethylene, hexamethylene, octamethylene, and decamethylene groups, branched alkylene groups such as methyl methylene, methyl ethylene, 1-methyl pentylene, and 1,4-dimethyl butylene groups, and cyclic alkylene groups such as cyclopropylene, cyclobutylene, and cyclohexylene groups. Preferred among these are linear alkylene groups such as a single bond and methylene, ethylene, n-propylene, and n-butylene groups. More preferred are a single bond and methylene and ethylene groups.

In the formula (2-1), when at least either $X^1$ or $X^2$ is a metal atom, examples of the metal atom include a sodium atom, a lithium atom, and a potassium atom. Preferred among these is a sodium atom.

The structural unit represented by the formula (2-1) is preferably derived from an α-dicarboxy monomer. Examples of the α-dicarboxy monomer include dicarboxylic acids having a radically polymerizable unsaturated double bond such as methylenemalonic acid, itaconic acid, 2-methylene glutaric acid, 2-methylene adipic acid, and 2-methylene sebacic acid, their metal salts, and their methyl esters. Preferred among these are itaconic acid, its metal salts, and its methyl ester.

The α-dicarboxy monomer herein refers to a monomer having two carboxy groups on the α-carbon atom.

In the formula (2-2), $R^4$, $R^5$, and $R^6$ each independently represent a hydrogen atom or a C1-C10 alkyl group, $R^7$ represents a C0-C10 alkylene group, and $X^3$ represents a hydrogen atom, a metal atom, or a methyl group.

In the formula (2-2), the lower limit of the carbon number of each of the alkyl groups represented by $R^4$, $R^5$, and $R^6$ is preferably 1, and the upper limit thereof is preferably 5, more preferably 3.

$R^4$, $R^5$, and $R^6$ may be the same as or different from each other and are preferably the same as each other. $R^4$, $R^5$, and $R^6$ are preferably hydrogen atoms.

Examples of the C1-C10 alkyl group include linear alkyl groups such as a methyl, ethyl, propyl, n-butyl, n-pentyl, n-heptyl, n-octyl, n-nonyl, and n-decyl groups, branched alkyl groups such as isopropyl, isobutyl, sec-butyl, tert-butyl, isopentyl, 2,2-dimethylpropyl, 1,1,3,3-tetramethylbutyl, and 2-ethylhexyl groups, and cycloalkyl groups such as cyclopropyl, cyclopropylmethyl, cyclobutyl, cyclopentyl, and cyclohexyl groups. Preferred among these are linear alkyl groups such as methyl, ethyl, propyl, and n-butyl groups. More preferred are methyl and ethyl groups.

Examples of $R^7$ in the formula (2-2) include the same groups as listed above for $R^2$ and $R^3$ in the formula (2-1). Preferred among these are linear alkylene groups such as a single bond and methylene, ethylene, trimethylene, and tetramethylene groups. More preferred are a single bond and methylene and ethylene groups. Still more preferred is a single bond.

In the formula (2-2), when $X^3$ is a metal atom, examples of the metal atom include a sodium atom, a lithium atom, and a potassium atom. Preferred among these is a sodium atom.

The structural unit represented by the formula (2-2) is preferably derived from a monocarboxy monomer. Examples of the monocarboxy monomer include monocarboxylic acids having a radically polymerizable unsaturated double bond such as acrylic acid, crotonic acid, methacrylic acid, and oleic acid, their metal salts, and their methyl esters. Preferred among these are crotonic acid, its metal salts, and its methyl ester.

In the formula (2-3), $R^8$ and $R^{10}$ each independently represent a hydrogen atom or a C1-C10 alkyl group, $R^9$ and $R^{11}$ each represent a C0-C10 alkylene group, and $X^4$ and $X^5$ each represent a hydrogen atom, a metal atom, or a methyl group.

In the formula (2-3), the lower limit of the carbon number of each of the alkyl groups represented by $R^8$ and $R^{10}$ is preferably 1, and the upper limit thereof is preferably 5, more preferably 3.

$R^8$ and $R^{10}$ may be the same as or different from each other and are preferably the same as each other.

Examples of $R^8$ and $R^{10}$ in the formula (2-3) include the same atom and groups as listed above for $R^4$, $R^5$, and $R^6$ in the formula (2-2). Preferred among them is a hydrogen atom.

Examples of $R^9$ and $R^{11}$ in the formula (2-3) include the same groups as listed above for $R^2$ and $R^3$ in the formula (2-1). Preferred among these are linear alkylene groups such as a single bond and methylene, ethylene, trimethylene, and tetramethylene groups. More preferred are a single bond and methylene and ethylene groups. Still more preferred is a single bond.

In the formula (2-3), when $X^4$ and $X^5$ are metal atoms, examples of the metal atoms include a sodium atom, a lithium atom, and a potassium atom. Preferred among these is a sodium atom.

When the acid-modified group is a sulfonic group, examples of a structural unit containing the sulfonic acid group include a structural unit represented by the following formula (3).

[Chem. 3]

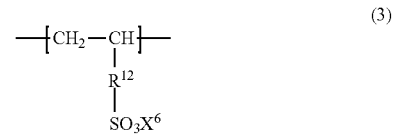

(3)

In the formula (3), $R^{12}$ represents a C0-C10 alkylene group, and $X^6$ represents a hydrogen atom, a metal atom, or a methyl group.

Examples of $R^{12}$ in the formula (3) include the same groups as listed above for $R^2$ and $R^3$ in the formula (2-1). Preferred among these are linear alkylene groups such as a single bond and methylene, ethylene, trimethylene, and tetramethylene groups. More preferred are a single bond and methylene and ethylene groups. Still more preferred are a single bond and a methylene group.

In the formula (3), when $X^6$ is a metal atom, examples of the metal atom include a sodium atom, a lithium atom, and a potassium atom. Preferred among these is a sodium atom.

When the acid-modified group is an amide group, examples of a structural unit containing the amide group include a structural unit represented by the following formula (4).

[Chem. 4]

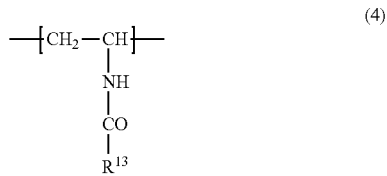

(4)

In the formula (4), $R^{13}$ represents a C1-C10 alkyl group.

Examples of $R^{13}$ in the formula (4) include the same atom and groups as listed above for $R^4$, $R^5$, and $R^6$ in the formula (2-2). Preferred among these are a hydrogen atom and linear alkyl groups such as methyl, ethyl, propyl, and n-butyl groups. More preferred are a hydrogen atom and methyl and ethyl groups.

The polyvinyl acetal resin preferably has an average degree of polymerization of 200 or greater, more preferably 250 or greater, while preferably 4,000 or less, more preferably 3,700 or less.

The average degree of polymerization within the range can lead to good dispersibility.

The polyvinyl acetal resin is preferably an acetalized product of a polyvinyl alcohol resin having a degree of saponification of 70.0 mol % or greater and 99.9 mol % or less.

Such a polyvinyl acetal resin can further increase the dispersibility of the fibrous carbon material.

The polyvinyl acetal resin preferably has a glass transition temperature of 70° C. or higher, more preferably 71° C. or higher, while preferably 95° C. or lower, more preferably 91° C. or lower.

The glass transition temperature can be measured using a dynamic mechanical analyzer (DMA).

A 25% by weight aqueous solution of the polyvinyl acetal resin preferably has a specific gravity of 1.02 or greater and 1.08 or less.

The specific gravity can be measured using a glass Baume hydrometer at a temperature of the resin aqueous solution of 20° C.

The amount of the polyvinyl acetal resin in the carbon material composition of the present invention is preferably 0.1% by weight or more, more preferably 0.5% by weight or more, while preferably 20.0% by weight or less, more preferably 15.0% by weight or less.

The carbon material composition of the present invention preferably has a ratio of the amount of the polyvinyl acetal resin to the amount of the fibrous carbon material (amount of polyvinyl acetal resin/amount of fibrous carbon material) of 0.05 or greater and 10.0 or less.

When the ratio is not less than the lower limit, the fibrous carbon material can have good dispersibility and easily form conduction paths. As a result, an even better surface resistance value can be obtained. When the ratio is not greater than the upper limit, the fibrous carbon material, which imparts electrical conductivity, is sufficiently present, resulting in an even better surface resistance value.

The ratio of the amounts is more preferably 0.10 or greater and 8.00 or less.

The carbon material composition of the present invention preferably has a ratio of the amount (unit: g) of the fibrous carbon material, the average fiber diameter (unit: nm) of the fibrous carbon material, and the amount (unit: g) of the polyvinyl acetal resin (amount of polyvinyl acetal resin/(average fiber diameter of fibrous carbon material/amount of fibrous carbon material)) of 0.01 or greater, more preferably 0.02 or greater, while preferably 7.00 or less, more preferably 6.40 or less.

The polyvinyl acetal resin may be produced by, for example, a method including polymerizing a monomer such as vinyl acetate to prepare a polyvinyl acetate resin, saponifying the polyvinyl acetate resin by adding an acid or alkali, subjecting the resulting polyvinyl alcohol resin to purifying or the like to adjust its Na ion content, and acetalizing the polyvinyl alcohol resin.

The polyvinyl alcohol resin may be, for example, a conventionally known polyvinyl alcohol resin such as a resin produced by saponifying a polyvinyl acetate resin with an alkali, an acid, aqueous ammonia, or the like.

The polyvinyl alcohol resin may be completely saponified, but is not necessarily completely saponified and may be a partially saponified polyvinyl alcohol resin as long as the polyvinyl alcohol resin has at least one unit having a hydroxyl group diad for a meso or a racemo position in at least one position of the main chain. Examples of other polyvinyl alcohol resins that can be used include copolymers of vinyl alcohol and a monomer copolymerizable with vinyl alcohol, such as ethylene-vinyl alcohol copolymer resins and partially saponified ethylene-vinyl alcohol copolymer resins.

Examples of the polyvinyl acetate resin include ethylene-vinyl acetate copolymers.

The polyvinyl alcohol resin preferably has a degree of saponification of 70.0 mol % or greater and 99.9 mol % or less, more preferably 85.0 mol % or greater and 95.0 mol % or less.

Using the polyvinyl alcohol resin can further increase the dispersibility of the fibrous carbon material.

The acetalization may be carried out by a known method and is preferably carried out in a water-based solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, amide solvents, and amine solvents.

Examples of the alcoholic organic solvents include methanol, ethanol, n-propanol, isopropanol, n-butanol, and tert-butanol.

Examples of the aromatic organic solvents include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of the ability to dissolve resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluenesulfonic acid. Each of these may be used alone, or two or more of these may be used in combination. Preferred among these are hydrochloric acid, nitric acid, and sulfuric acid, and particularly preferred is hydrochloric acid.

The aldehyde used for the acetalization may be an aldehyde having a C1-C10 chain aliphatic group, a C1-C10 cyclic aliphatic group, or a C1-C10 aromatic group. The aldehyde used may be a conventionally known aldehyde. The aldehyde used for the acetalization reaction is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include aromatic aldehydes such as benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

Cyclic multimers such as paraldehyde and metaldehyde may also be used.

Each of these aldehydes may be used alone, or two or more thereof may be used in combination. Preferred among these aldehydes are formaldehyde, acetaldehyde, butyraldehyde, 2-ethylhexylaldehyde, n-nonylaldehyde, and paraldehyde because they have excellent acetalization reactivity and can give a sufficient internal plasticization effect and in turn favorable flexibility to the resulting resin. More preferred are formaldehyde, acetaldehyde, butyraldehyde, and paraldehyde because an adhesive composition particularly excellent in impact resistance and adhesion to metal can be obtained.

The amount of the aldehyde to be added can be appropriately determined according to the acetal group content of the aimed polyvinyl acetal resin. In particular, the amount may be 60 to 95 mol %, preferably 65 to 90 mol % relative to 100 mol % of the polyvinyl alcohol resin. The amount in the range is preferred because the acetalization reaction can be efficiently carried out and unreacted aldehyde can be easily removed.

The carbon material composition of the present invention may further contain additives such as other binders, conductive aids, flame retardant auxiliaries, defoamers, leveling agents, and adhesion-imparting agents as long as the effects of the present invention are not impaired.

The method for producing the carbon material composition of the present invention is not limited. For example, a polyvinyl acetal resin obtained by acetalizing raw material polyvinyl alcohol and a fibrous carbon material are added to a water-based solvent and mixed.

The mixing may be performed using any of various mixers such as a ball mill, a blender mill, and a triple roll mill.

A composition for a lithium secondary battery electrode can be obtained by adding an active material to the carbon material composition of the present invention.

Examples of the active material include a positive electrode active material and a negative electrode active material.

Examples of the positive electrode active material include particles of oxides containing lithium and a transition metal element as constituent metal elements (lithium transition metal oxides), such as lithium nickel oxides (e.g., $LiNiO_2$), lithium cobalt oxides (e.g., $LiCoO_2$), lithium manganese oxides (e.g., $LiMn_2O_4$), and composites thereof (e.g., $LiNi_{0.5}Mn_{1.5}O_4$, $LiNi_{1/3}CO_{1/3}Mn_{1/3}O_2$). Examples of the positive electrode active material also include particles of phosphates containing lithium and a transition metal element as constituent metal elements, such as lithium manganese phosphate ($LiMnPO_4$) and lithium iron phosphate ($LiFePO_4$).

Each of these may be used alone, or two or more of these may be used in combination.

Examples of the negative electrode active material include materials conventionally used as negative electrode active materials for lithium secondary batteries. Examples of such materials include carbon materials such as graphite, natural graphite, graphite carbon, and amorphous carbon, lithium transition metal oxides, lithium transition metal nitrides, silicon, and silicon compounds such as silicon oxide.

The method for producing the composition for a lithium secondary battery electrode is not limited. For example, the active material, the carbon material composition of the present invention, and optional additives are mixed with any of various mixers such as a ball mill, a blender mill, and a triple roll mill.

The composition for a lithium secondary battery electrode may be, for example, applied to an electrically conductive substrate and dried to form a lithium secondary battery electrode.

The application method may be any of various application methods such as an extrusion coater, a reverse roller, a doctor blade, and an applicator.

Advantageous Effects of Invention

The present invention can provide a carbon material composition excellent in the dispersibility of a fibrous carbon material and capable of reducing electrode resistance.

DESCRIPTION OF EMBODIMENTS

The present invention is more specifically described in the following with reference to, but not limited to, examples.

Example 1

(Preparation of Polyvinyl Acetal Resin)

An amount of 500 g of a polyvinyl alcohol resin (degree of saponification 88 mol %, average degree of polymerization 200, hydroxy group half width 360 cm$^{-1}$) was added to 2,500 g of pure water and stirred at 90° C. for two hours for dissolution. This solution was cooled to 40° C., and to the solution was added 10 g of hydrochloric acid having a concentration of 35% by weight. The solution temperature was then cooled to 5° C. and 75 g of acetaldehyde was added. This temperature was maintained and acetalization reaction was performed. The solution was maintained at a solution temperature of 65° C. for five hours to complete the reaction, and 40 g of an aqueous sodium hydroxide solution was added for neutralization reaction. Then, 5,000 g of pure water was added, stirred, and then 5,000 g of water was removed by decantation. Further, the step of adding 5,000 g of pure water, stirring, and removing water by decantation was repeated three times in total. The solid content of the resin was then adjusted to 20% by weight using ion-exchanged water, whereby a polyvinyl acetal resin was obtained.

The hydroxy group half width of the polyvinyl alcohol resin was measured by IR measurement using HORIBA FT-720 (available from Horiba, Ltd.).

The obtained polyvinyl acetal resin was analyzed by $^1$H-NMR (nuclear magnetic resonance spectroscopy) to measure the acetal group content, the hydroxy group content, the acetyl group content, and the blockiness of hydrophobic groups. Table 1 shows the results. The 1H-NMR measurement was performed using deuterated DMSO as a solvent.

The glass transition temperature of the obtained polyvinyl acetal resin was measured using a dynamic mechanical analyzer (DMA). Table 1 shows the results.

The specific gravity of the obtained polyvinyl acetal resin in the form of a 25% by weight aqueous solution was measured using a glass Baume hydrometer, with the 25% by weight aqueous solution set at 20° C. Table 1 shows the results.

(Preparation of Carbon Material Composition)

To 97.0 g of water were added 1.0 g of the obtained polyvinyl acetal resin and 2.0 g of a fibrous carbon material, followed by mixing, whereby a carbon material composition was obtained.

The fibrous carbon material used was multi-walled carbon nanotubes (MW, available from Sigma-Aldrich, average fiber diameter 9 nm, average fiber length 13 μm, specific gravity 1.8, specific surface area 200 m$^2$/g, number of layers 8, G/D ratio 0.6).

Example 2

A polyvinyl acetal resin was obtained as in Example 1 except that in (Preparation of polyvinyl acetal resin), a polyvinyl alcohol resin (degree of saponification 88 mol %, average degree of polymerization 600, hydroxy group half width 360 cm$^{-1}$) was used.

A carbon material composition was obtained as in Example 1 except that the obtained polyvinyl acetal resin was used.

Example 3

A polyvinyl acetal resin was obtained as in Example 1 except that in (Preparation of polyvinyl acetal resin), a polyvinyl alcohol resin (degree of saponification 88 mol %, average degree of polymerization 1,250, hydroxy group half width 360 cm$^{-1}$) was used.

A carbon material composition was obtained as in Example 1 except that the obtained polyvinyl acetal resin was used.

Example 4

A polyvinyl acetal resin was obtained as in Example 1 except that in (Preparation of polyvinyl acetal resin), a polyvinyl alcohol resin (degree of saponification 88 mol %, average degree of polymerization 2,000, hydroxy group half width 360 cm$^{-1}$) was used.

A carbon material composition was obtained as in Example 1 except that the obtained polyvinyl acetal resin was used.

Example 5

A polyvinyl acetal resin was obtained as in Example 1 except that in (Preparation of polyvinyl acetal resin), a polyvinyl alcohol resin (degree of saponification 88 mol %, average degree of polymerization 4,000, hydroxy group half width 340 cm$^{-1}$) was used.

A carbon material composition was obtained as in Example 1 except that the obtained polyvinyl acetal resin was used.

Example 6

A polyvinyl acetal resin was obtained as in Example 1 except that in (Preparation of polyvinyl acetal resin), a polyvinyl alcohol resin (degree of saponification 88 mol %, average degree of polymerization 200, hydroxy group half width 345 cm$^{-1}$) was used and 56 g of acetaldehyde was used.

A carbon material composition was obtained as in Example 1 except that the obtained polyvinyl acetal resin was used.

Example 7

A polyvinyl acetal resin was obtained as in Example 1 except that in (Preparation of polyvinyl acetal resin), a polyvinyl alcohol resin (degree of saponification 88 mol %, average degree of polymerization 200, hydroxy group half width 340 cm$^{-1}$) was used and 16 g of n-butyraldehyde was used.

A carbon material composition was obtained as in Example 1 except that the obtained polyvinyl acetal resin was used.

Example 8

A polyvinyl acetal resin was obtained as in Example 1 except that in (Preparation of polyvinyl acetal resin), a polyvinyl alcohol resin (degree of saponification 88 mol %, average degree of polymerization 200, hydroxy group half width 370 cm$^{-1}$) was used.

A carbon material composition was obtained as in Example 1 except that the obtained polyvinyl acetal resin was used.

Example 9

A polyvinyl acetal resin was obtained as in Example 6 except that in (Preparation of polyvinyl acetal resin), a polyvinyl alcohol resin (degree of saponification 88 mol %, average degree of polymerization 200, hydroxy group half width 370 cm$^{-1}$) was used.

A carbon material composition was obtained as in Example 1 except that the obtained polyvinyl acetal resin was used.

Example 10

A polyvinyl acetal resin was obtained as in Example 7 except that in (Preparation of polyvinyl acetal resin), a polyvinyl alcohol resin (degree of saponification 88 mol %, average degree of polymerization 200, half width 365 cm$^{-1}$) was used.

A carbon material composition was obtained as in Example 1 except that the obtained polyvinyl acetal resin was used.

Example 11

A carbon material composition was obtained as in Example 1 except that single-walled carbon nanotubes (SW, available from OCSiAl, average fiber diameter 1.2 nm, average fiber length 4 μm or greater, specific gravity 1.3, specific surface area 390 m$^2$/g, G/D ratio 32) were used as the fibrous carbon material and mixed in accordance with the formulation shown in Table 1.

Example 12

A carbon material composition was obtained as in Example 11 except that the polyvinyl acetal resin obtained in Example 6 was used.

Example 13

A polyvinyl acetal resin was obtained as in Example 2 except that in (Preparation of polyvinyl acetal resin), 16 g of acetaldehyde was used.

A carbon material composition was obtained as in Example 11 except that the obtained polyvinyl acetal resin was used.

Example 14

A carbon material composition was obtained as in Example 11 except that the polyvinyl acetal resin obtained in Example 8 was used.

Example 15

A polyvinyl acetal resin was obtained as in Example 6 except that in (Preparation of polyvinyl acetal resin), a polyvinyl alcohol resin (degree of saponification 88 mol %, average degree of polymerization 300, hydroxy group half width 360 cm$^{-1}$) was used.

A carbon material composition was obtained as in Example 11 except that the obtained polyvinyl acetal resin was used.

Example 16

A polyvinyl acetal resin was obtained as in Example 7 except that in (Preparation of polyvinyl acetal resin), a polyvinyl alcohol resin (degree of saponification 88 mol %, average degree of polymerization 600, hydroxy group half width 340 cm$^{-1}$) was used.

A carbon material composition was obtained as in Example 11 except that the obtained polyvinyl acetal resin was used.

Example 17

A polyvinyl acetal resin was obtained as in Example 6 except that in (Preparation of polyvinyl acetal resin), a polyvinyl alcohol resin (degree of saponification 88 mol %, average degree of polymerization 600, hydroxy group half width 350 cm$^{-1}$) was used.

A carbon material composition was obtained as in Example 1 except that the obtained polyvinyl acetal resin was used, and that vapor-grown carbon fiber (VGCF, available from Showa Denko K.K., average fiber diameter 150 nm, average fiber length 15 μm, specific gravity 2.1, specific surface area 13 m$^2$/g, G/D ratio 5.4) was used as the fibrous carbon material and mixed in accordance with the formulation shown in Table 1.

Example 18

A polyvinyl acetal resin was obtained as in Example 1 except that in (Preparation of polyvinyl acetal resin), a polyvinyl alcohol resin (degree of saponification 75 mol %, average degree of polymerization 600, hydroxy group half width 370 cm$^{-1}$) was used and 61 g of acetaldehyde was used.

A carbon material composition was obtained as in Example 1 except that the obtained polyvinyl acetal resin was used.

Example 19

A polyvinyl acetal resin was obtained as in Example 1 except that in (Preparation of polyvinyl acetal resin), a polyvinyl alcohol resin (degree of saponification 88 mol %, average degree of polymerization 150, hydroxy group half width 360 cm$^{-1}$) was used.

A carbon material composition was obtained as in Example 1 except that the obtained polyvinyl acetal resin was used.

Example 20

A polyvinyl acetal resin was obtained as in Example 1 except that in (Preparation of polyvinyl acetal resin), a polyvinyl alcohol resin (degree of saponification 88 mol %, average degree of polymerization 4,500, hydroxy group half width 340 cm$^{-1}$) was used and 66 g of acetaldehyde was used.

A carbon material composition was obtained as in Example 1 except that the obtained polyvinyl acetal resin was used.

Example 21

A polyvinyl acetal resin was obtained as in Example 1 except that in (Preparation of polyvinyl acetal resin), a polyvinyl alcohol resin (degree of saponification 88 mol %, average degree of polymerization 600, hydroxy group half width 340 cm$^{-1}$) was used and 9 g of acetaldehyde was used.

A carbon material composition was obtained as in Example 1 except that the obtained polyvinyl acetal resin was used.

Example 22

A polyvinyl acetal resin was obtained as in Example 1 except that in (Preparation of polyvinyl acetal resin), a polyvinyl alcohol resin including a structural unit containing a carboxy group (degree of saponification 88 mol %, average degree of polymerization 600, hydroxy group half width 350 cm$^{-1}$, amount of structural unit containing carboxy group 1.2 mol %) was used. The structural unit containing a carboxy group was a structural unit represented by the formula (2-1) (wherein R$^2$ is a single bond, R$^3$ is a methylene group, and X$^1$ and X$^2$ are hydrogen atoms).

A carbon material composition was obtained as in Example 1 except that the obtained polyvinyl acetal resin was used.

Example 23

A polyvinyl acetal resin was obtained as in Example 1 except that in (Preparation of polyvinyl acetal resin), a polyvinyl alcohol resin including a structural unit containing a sulfonic acid group (degree of saponification 88 mol %, average degree of polymerization 600, hydroxy group half width 350 cm$^{-1}$, amount of structural unit containing sulfonic acid group 1.0 mol %) was used. The structural unit containing a sulfonic acid group was a structural unit represented by the formula (3) (wherein R$^{12}$ is a methylene group and X$^6$ is a sodium atom).

A carbon material composition was obtained as in Example 1 except that the obtained polyvinyl acetal resin was used.

Example 24

A polyvinyl acetal resin was obtained as in Example 1 except that in (Preparation of polyvinyl acetal resin), a polyvinyl alcohol resin including a structural unit containing an amide group (degree of saponification 88 mol %, average degree of polymerization 600, hydroxy group half width 350 cm$^{-1}$, amount of structural unit containing amide group 1.3 mol %) was used. The structural unit containing an amide group was a structural unit represented by the formula (4) (wherein R$^{13}$ is a methyl group).

A carbon material composition was obtained as in Example 1 except that the obtained polyvinyl acetal resin was used.

Example 25

A carbon material composition was obtained as in Example 2 except that multi-walled carbon nanotubes (MW, available from Sigma-Aldrich, average fiber diameter 9 nm, average fiber length 13 μm, specific gravity 1.8, specific surface area 200 m$^2$/g) were used as the fibrous carbon material and mixed in accordance with the formulation shown in Table 2.

Example 26

A carbon material composition was obtained as in Example 2 except that single-walled carbon nanotubes (SW, available from OCSiAl, average fiber diameter 1.2 nm, average fiber length 4 μm or greater, specific gravity 1.3) were used as the fibrous carbon material and mixed in accordance with the formulation shown in Table 2.

Example 27

A polyvinyl acetal resin was obtained as in Example 1 except that in (Preparation of polyvinyl acetal resin), a polyvinyl alcohol resin (degree of saponification 99.9 mol %, average degree of polymerization 600, hydroxy group half width 370 cm$^{-1}$) was used and 85 g of acetaldehyde was used.

A carbon material composition was obtained as in Example 1 except that the obtained polyvinyl acetal resin was used.

Example 28

A polyvinyl acetal resin was obtained as in Example 1 except that in (Preparation of polyvinyl acetal resin), a polyvinyl alcohol resin (degree of saponification 65 mol %, average degree of polymerization 600, hydroxy group half width 355 cm$^{-1}$) was used and 70 g of acetaldehyde was used.

A carbon material composition was obtained as in Example 1 except that the obtained polyvinyl acetal resin was used.

Comparative Example 1

A carbon material composition was obtained as in Example 1 except that a polyvinyl alcohol resin (degree of saponification 12 mol %, average degree of polymerization 600, hydroxy group half width 325 cm$^{-1}$) was used instead of the polyvinyl acetal resin.

Comparative Example 2

A carbon material composition was obtained as in Example 1 except that polyvinyl pyrrolidone (average degree of polymerization 10,000) was used instead of the polyvinyl acetal resin.

Comparative Example 3

A carbon material composition was obtained as in Example 2 except that acetylene black (available from Denka Company Limited, average particle size 35 nm, specific surface area 68 m$^2$/g) was used instead of the fibrous carbon material and mixed in accordance with the formulation shown in Table 2.

Comparative Example 4

A carbon material composition was obtained as in Example 17 except that graphene (available from Sigma-Aldrich, average particle size 5 μm) was used instead of the fibrous carbon material.

Comparative Example 5

A polyvinyl acetal resin was obtained as in Example 1 except that in (Preparation of polyvinyl acetal resin), a polyvinyl alcohol resin (degree of saponification 88 mol %, average degree of polymerization 4,500, hydroxy group half width 325 cm$^{-1}$) was used and 9 g of acetaldehyde was used.

A carbon material composition was obtained as in Example 1 except that the obtained polyvinyl acetal resin was used.

Comparative Example 6

A polyvinyl acetal resin was obtained as in Example 1 except that in (Preparation of polyvinyl acetal resin), a polyvinyl alcohol resin (degree of saponification 88 mol %, average degree of polymerization 150, hydroxy group half width 385 cm$^{-1}$) was used and 82 g of acetaldehyde was used.
A carbon material composition was obtained as in Example 1 except that the obtained polyvinyl acetal resin was used.

Comparative Example 7

A polyvinyl acetal resin was obtained as in Example 1 except that in (Preparation of polyvinyl acetal resin), a polyvinyl alcohol resin (degree of saponification 88 mol %, average degree of polymerization 4,500, hydroxy group half width 340 cm$^{-1}$) was used and 93 g of acetaldehyde was used.
A carbon material composition was obtained as in Example 1 except that the obtained polyvinyl acetal resin was used.

Comparative Example 8

A polyvinyl acetal resin was obtained as in Example 1 except that in (Preparation of polyvinyl acetal resin), a polyvinyl alcohol resin (degree of saponification 88 mol %, average degree of polymerization 150, hydroxy group half width 370 cm$^{-1}$) was used and 93 g of acetaldehyde was used.
A carbon material composition was obtained as in Example 1 except that the obtained polyvinyl acetal resin was used.

Comparative Example 9

A polyvinyl acetal resin was obtained as in Example 1 except that in (Preparation of polyvinyl acetal resin), 93 g of acetaldehyde was used.
A carbon material composition was obtained as in Example 1 except that the obtained polyvinyl acetal resin was used.

Comparative Example 10

A polyvinyl acetal resin was obtained as in Example 1 except that in (Preparation of polyvinyl acetal resin), a polyvinyl alcohol resin (degree of saponification 88 mol %, average degree of polymerization 200, hydroxy group half width 385 cm$^{-1}$) was used and 82 g of acetaldehyde was used.
A carbon material composition was obtained as in Example 1 except that the obtained polyvinyl acetal resin was used.

Comparative Example 11

A polyvinyl acetal resin was obtained as in Example 1 except that in (Preparation of polyvinyl acetal resin), a polyvinyl alcohol resin (degree of saponification 88 mol %, average degree of polymerization 200, hydroxy group half width 330 cm$^{-1}$) was used and 82 g of acetaldehyde was used.
A carbon material composition was obtained as in Example 1 except that the obtained polyvinyl acetal resin was used.

Comparative Example 12

A polyvinyl acetal resin was obtained as in Example 1 except that in (Preparation of polyvinyl acetal resin), a polyvinyl alcohol resin (degree of saponification 88 mol %, average degree of polymerization 600, hydroxy group half width 325 cm$^{-1}$) was used.
A carbon material composition was obtained as in Example 1 except that the obtained polyvinyl acetal resin was used.

Comparative Example 13

A polyvinyl acetal resin was obtained as in Example 1 except that in (Preparation of polyvinyl acetal resin), a polyvinyl alcohol resin (degree of saponification 88 mol %, average degree of polymerization 600, hydroxy group half width 380 cm$^{-1}$) was used.
A carbon material composition was obtained as in Example 1 except that the obtained polyvinyl acetal resin was used.

<Evaluation>

The carbon material compositions obtained in the examples and the comparative examples were evaluated as follows. Tables 3 and 4 show the results.

(1) Dispersibility (1-1) Particle Size Distribution

The obtained carbon material composition was stirred for 10 minutes using an ultrasonic disperser (available from SND Co., Ltd., "US-303"). The composition was then subjected to particle size distribution measurement using a laser diffraction particle size distribution analyzer (available from Horiba, Ltd., "KA-910") to measure the D50 particle size. Further, the D50 particle size after the composition was left to stand at 23° C. for one week was measured in the same manner. The rate of change of the D50 particle size was calculated and evaluated in accordance with the following criteria.

A: The rate of change was lower than 30%.
  B: The rate of change was 30% or higher and lower than 60%.
  C: The rate of change was 60% or higher and lower than 80%.
  D: The rate of change was 80% or higher.

A low rate of change of the particle size distribution indicates excellent dispersibility and excellent storage stability.

(1-2) Settling Properties

The solid content of the obtained carbon material composition was measured. Subsequently, the composition was centrifuged at 3,000 rpm for 30 minutes using a centrifuge H-18F, available from Kokusan Co., Ltd. The supernatant (90 vol %) was collected, and the solid content was measured to calculate the rate of change of the solid content before and after centrifugation. The settling properties were evaluated in accordance with the following criteria.

A: The rate of change before and after centrifugation was 95% or higher.
  B: The rate of change before and after centrifugation was lower than 95% and 90% or higher.

C: The rate of change before and after centrifugation was lower than 90% and 85% or higher.

D: The rate of change before and after centrifugation was lower than 85%.

Good settling properties indicate excellent storage stability.

(1-3) Rheology

The viscosity of the obtained carbon material composition was measured using a rotational rheometer (available from Thermo Fisher Scientific; HAAKE Rheo Stress 3000) under the following measurement conditions in a CR flow curve mode while continuously changing the shear rate from 0.01 to 100 [1/s] at a constant rate.

<Measurement Conditions>

Rotating disc: flat plate

Rotating disc diameter: 35 mm

Gap: 0.5 mm

The viscosity at a shear rate of 1 [0.1/s] was compared, and the rheological properties were evaluated in accordance with the following criteria.

A: The viscosity was lower than 100 mPa·s.

B: The viscosity was 100 mPa·s or higher and lower than 200 mPa·s.

C: The viscosity was 200 mPa·s or higher and lower than 300 mPa·s.

D: The viscosity was 300 mPa·s or higher.

Good rheological properties indicate excellent stability over time and excellent slurry handleability.

(2) Sheet Evaluation (Preparation of Sheet)

The obtained carbon material composition was applied to a release-treated polyethylene terephthalate (PET) film to a dried thickness of 20 μm, dried, and separated from the PET film. A sheet was thus prepared.

(2-1) Surface Resistance Value

The electrode resistance of the obtained sheet was measured using an electrode resistance meter (available from Hioki E.E. Corporation) and evaluated based on the following criteria.

A: The electrode resistance value was lower than 100 Ω/sq.

B: The electrode resistance value was 100 Ω/sq or higher and lower than 120 Ω/sq.

C: The electrode resistance value was 120 Ω/sq or higher and lower than 150 Ω/sq.

D: The electrode resistance value of 150 Ω/sq or higher.

A low surface resistance value indicates excellent electrical conductivity.

(2-2) Average Surface Roughness

The average surface roughness Ra of the obtained sheet was measured in conformity with JIS B 0601 (1994) and evaluated based on the following criteria.

A: The Ra was lower than 3 μm.

B: The Ra was 3 μm or higher and lower than 5 μm.

C: The Ra was 5 μm or higher and lower than 9 μm.

D: The Ra was 9 μm or higher.

A low average surface roughness Ra indicates excellent smoothness and excellent adhesion.

TABLE 1

| | Aqueous carbon material composition | | | | | | | |
|---|---|---|---|---|---|---|---|---|
| | Polyvinyl acetal resin | | | | | | | |
| | Average degree of polymerization | Acetal group content (mol %) | Hydroxy group content (mol %) | Acetyl group content (mol %) | Blockiness of hydrophobic groups | Modified group type | Modified group content (mol %) | Glass transition temperature (° C.) |
| Example 1 | 200 | 32.0 | 56.0 | 12.0 | 0.62 | — | — | 91 |
| Example 2 | 600 | 32.0 | 56.0 | 12.0 | 0.66 | — | — | 91 |
| Example 3 | 1250 | 32.0 | 56.0 | 12.0 | 0.61 | — | — | 91 |
| Example 4 | 2000 | 32.0 | 56.0 | 12.0 | 0.63 | — | — | 90 |
| Example 5 | 4000 | 32.0 | 56.0 | 12.0 | 0.46 | — | — | 89 |
| Example 6 | 200 | 24.0 | 64.0 | 12.0 | 0.48 | — | — | 88 |
| Example 7 | 200 | 7.0 | 81.0 | 12.0 | 0.41 | — | — | 80 |
| Example 8 | 200 | 32.0 | 56.0 | 12.0 | 0.74 | — | — | 91 |
| Example 9 | 200 | 24.0 | 64.0 | 12.0 | 0.70 | — | — | 88 |
| Example 10 | 200 | 7.0 | 81.0 | 12.0 | 0.67 | — | — | 80 |
| Example 11 | 200 | 32.0 | 56.0 | 12.0 | 0.62 | — | — | 91 |
| Example 12 | 200 | 24.0 | 64.0 | 12.0 | 0.48 | — | — | 87 |
| Example 13 | 600 | 7.0 | 81.0 | 12.0 | 0.61 | — | — | 80 |
| Example 14 | 200 | 32.0 | 56.0 | 12.0 | 0.74 | — | — | 91 |
| Example 15 | 300 | 24.0 | 64.0 | 12.0 | 0.61 | — | — | 87 |
| Example 16 | 600 | 7.0 | 81.0 | 12.0 | 0.42 | — | — | 80 |
| Example 17 | 600 | 24.0 | 64.0 | 12.0 | 0.51 | — | — | 86 |
| Example 18 | 600 | 26.0 | 49.0 | 25.0 | 0.72 | — | — | 88 |
| Example 19 | 150 | 32.0 | 56.0 | 12.0 | 0.67 | — | — | 91 |
| Example 20 | 4500 | 28.0 | 60.0 | 12.0 | 0.45 | — | — | 88 |
| Example 21 | 600 | 4.0 | 84.0 | 12.0 | 0.39 | — | — | 79 |

TABLE 1-continued

| | | Aqueous carbon material composition | | | | | | |
|---|---|---|---|---|---|---|---|---|
| | | Polyvinyl acetal resin | | Carbon material | | | | |
| | | Specific gravity of 25% by weight aqueous solution | [a] Amount (g) | Type | [b] Average fiber length (nm) | [c] Amount (g) | Water-based solvent (g) | [a]/ ([b]/[c]) |
| | Example 1 | 1.06 | 1 | MW | 9 | 2 | 97 | 0.222 |
| | Example 2 | 1.06 | 1 | MW | 9 | 2 | 97 | 0.222 |
| | Example 3 | 1.06 | 1 | MW | 9 | 2 | 97 | 0.222 |
| | Example 4 | 1.07 | 1 | MW | 9 | 2 | 97 | 0.222 |
| | Example 5 | 1.08 | 1 | MW | 9 | 2 | 97 | 0.222 |
| | Example 6 | 1.05 | 1 | MW | 9 | 2 | 97 | 0.222 |
| | Example 7 | 1.05 | 1 | MW | 9 | 2 | 97 | 0.222 |
| | Example 8 | 1.06 | 1 | MW | 9 | 2 | 97 | 0.222 |
| | Example 9 | 1.05 | 1 | MW | 9 | 2 | 97 | 0.222 |
| | Example 10 | 1.05 | 1 | MW | 9 | 2 | 97 | 0.222 |
| | Example 11 | 1.06 | 8 | SW | 1.2 | 0.2 | 91.8 | 1.333 |
| | Example 12 | 1.05 | 8 | SW | 1.2 | 0.2 | 91.8 | 1.333 |
| | Example 13 | 1.06 | 8 | SW | 1.2 | 0.2 | 91.8 | 1.333 |
| | Example 14 | 1.06 | 8 | SW | 1.2 | 0.2 | 91.8 | 1.333 |
| | Example 15 | 1.05 | 8 | SW | 1.2 | 0.2 | 91.8 | 1.333 |
| | Example 16 | 1.06 | 8 | SW | 1.2 | 0.2 | 91.8 | 1.333 |
| | Example 17 | 1.05 | 1 | VGCF | 150 | 5 | 94 | 0.033 |
| | Example 18 | 1.06 | 1 | MW | 9 | 2 | 97 | 0.222 |
| | Example 19 | 1.05 | 1 | MW | 9 | 2 | 97 | 0.222 |
| | Example 20 | 1.08 | 1 | MW | 9 | 2 | 97 | 0.222 |
| | Example 21 | 1.06 | 1 | MW | 9 | 2 | 97 | 0.222 |

TABLE 2

| | Aqueous carbon material composition Polyvinyl acetal resin | | | | | | | |
|---|---|---|---|---|---|---|---|---|
| | Average degree of polymerization | Acetal group content (mol %) | Hydroxy group content (mol %) | Acetyl group content (mol %) | Blockiness of hydrophobic groups | Modified group type | Modified group content (mol %) | Glass transition temperature (° C.) |
| Example 22 | 600 | 32.0 | 54.8 | 12.0 | 0.55 | Carboxy group | 1.2 | 91 |
| Example 23 | 600 | 32.0 | 55.0 | 12.0 | 0.57 | Sulfonic acid group | 1.0 | 91 |
| Example 24 | 600 | 32.0 | 54.7 | 12.0 | 0.56 | Amide group | 1.3 | 91 |
| Example 25 | 600 | 32.0 | 56.0 | 12.0 | 0.66 | — | — | 91 |
| Example 26 | 600 | 32.0 | 56.0 | 12.0 | 0.66 | — | — | 91 |
| Example 27 | 600 | 32.0 | 67.9 | 0.1 | 0.66 | — | — | 89 |
| Example 28 | 600 | 32.0 | 33.0 | 35.0 | 0.66 | — | — | 85 |
| Comparative Example 1 | Polyvinyl alcohol resin | | | | 0.32 | — | — | 110 |
| Comparative Example 2 | Polyvinyl pyrrolidone | | | | | — | — | 87 |
| Comparative Example 3 | 600 | 32.0 | 56.0 | 12.0 | 0.66 | — | — | 9 |
| Comparative Example 4 | 600 | 24.0 | 64.0 | 12.0 | 0.51 | — | — | 87 |
| Comparative Example 5 | 4500 | 4.0 | 84.0 | 12.0 | 0.28 | — | — | 80 |
| Comparative Example 6 | 150 | 35.0 | 53.0 | 12.0 | 0.81 | — | — | 92 |
| Comparative Example 7 | 4500 | 45.0 | 43.0 | 12.0 | 0.45 | — | — | 96 |
| Comparative Example 8 | 150 | 45.0 | 43.0 | 12.0 | 0.72 | — | — | 95 |
| Comparative Example 9 | 200 | 45.0 | 43.0 | 12.0 | 0.68 | — | — | 96 |
| Comparative Example 10 | 200 | 35.0 | 53.0 | 12.0 | 0.82 | — | — | 92 |
| Comparative Example 11 | 200 | 35.0 | 53.0 | 12.0 | 0.33 | — | — | 92 |
| Comparative Example 12 | 600 | 32.0 | 56.0 | 12.0 | 0.31 | — | — | 91 |

TABLE 2-continued

| | | | | | | | | |
|---|---|---|---|---|---|---|---|---|
| Comparative Example 13 | 600 | 32.0 | 56.0 | 12.0 | 0.81 | — | — | 9 |

| | Aqueous carbon material composition | | | | | | |
|---|---|---|---|---|---|---|---|
| | Polyvinyl acetal resin | | Carbon material | | | | |
| | Specific gravity of 25% by weight aqueous solution | [a] Amount (g) | Type | [b] Average fiber length (nm) | [c] Amount (g) | Water-based solvent (g) | [a]/ ([b]/[c]) |
| Example 22 | 1.06 | 1 | MW | 9 | 2 | 97 | 0.222 |
| Example 23 | 1.06 | 1 | MW | 9 | 2 | 97 | 0.222 |
| Example 24 | 1.06 | 1 | MW | 9 | 2 | 97 | 0.222 |
| Example 25 | 1.06 | 8 | MW | 9 | 10 | 82 | 8.889 |
| Example 26 | 1.06 | 0. | SW | 1.2 | 0 | 100 | 0.008 |
| Example 27 | 1.06 | 1 | MW | 9 | 2 | 97 | 0.222 |
| Example 28 | 1.06 | 1 | MW | 9 | 2 | 97 | 0.222 |
| Comparative Example 1 | 1.05 | 1 | MW | 9 | 2 | 97 | 0.222 |
| Comparative Example 2 | 1.09 | 1 | MW | 9 | 2 | 97 | 0.222 |
| Comparative Example 3 | 1.06 | 1 | Acetylene black | — | 10 | 89 | — |
| Comparative Example 4 | 1.05 | 1 | Graphene | — | 5 | 94 | — |
| Comparative Example 5 | 1.07 | 1 | MW | 9 | 2 | 97 | 0.222 |
| Comparative Example 6 | 1.04 | 1 | MW | 9 | 2 | 97 | 0.222 |
| Comparative Example 7 | 1.09 | 1 | MW | 9 | 2 | 97 | 0.222 |
| Comparative Example 8 | 1.05 | 1 | MW | 9 | 2 | 97 | 0.222 |
| Comparative Example 9 | 1.05 | 1 | MW | 9 | 2 | 97 | 0.222 |
| Comparative Example 10 | 1.06 | 1 | MW | 9 | 2 | 97 | 0.222 |
| Comparative Example 11 | 1.06 | 1 | MW | 9 | 2 | 97 | 0.222 |
| Comparative Example 12 | 1.06 | 1 | MW | 9 | 2 | 97 | 0.222 |
| Comparative Example 13 | 1.06 | 1 | MW | 9 | 2 | 97 | 0.222 |

TABLE 3

| | Evaluation | | | | | | | | |
|---|---|---|---|---|---|---|---|---|---|
| | Dispersibility | | | | | Sheet evaluation | | | |
| | Particle size distribution | | Settling properties | | | Surface resistance value | | | |
| | | | | | | Electrode resistance value | | Average surface roughness Ra | |
| | Rate of change (%) | Evaluation | Rate of change (%) | Evaluation | Rheology mPa·s | Evaluation | (2/sq) | Evaluation | μm | Evaluation |
| Example 1 | 15.1 | A | 98.9 | A | 75.3 | A | 103.2 | B | 2.08 | A |
| Example 2 | 18.2 | A | 97.2 | A | 89.3 | A | 107.9 | B | 2.15 | A |
| Example 3 | 32.6 | B | 92.3 | B | 91.2 | A | 111.8 | B | 4.23 | B |
| Example 4 | 41.6 | B | 91.3 | B | 92.3 | A | 95.8 | A | 4.44 | B |
| Example 5 | 42.9 | B | 91.7 | B | 111.2 | B | 96.9 | A | 4.18 | B |
| Example 6 | 19.3 | A | 95.6 | A | 85.3 | A | 110.3 | B | 2.18 | A |
| Example 7 | 46.3 | B | 91.4 | B | 89.6 | A | 115.4 | B | 3.19 | B |
| Example 8 | 17.2 | A | 97.4 | A | 87.2 | A | 106.2 | B | 2.34 | A |
| Example 9 | 19.3 | A | 96.7 | A | 85.6 | A | 104.3 | B | 2.46 | A |
| Example 10 | 35.2 | B | 93.2 | B | 84.3 | A | 112.3 | B | 3.59 | B |
| Example 11 | 25.8 | A | 95.8 | A | 106.1 | B | 101.3 | B | 1.34 | A |

TABLE 3-continued

| | Evaluation | | | | | | | | | |
|---|---|---|---|---|---|---|---|---|---|---|
| | Dispersibility | | | | | Sheet evaluation | | | | |
| | Particle size distribution | | Settling properties | | | | Surface resistance value | | Average surface roughness | |
| | Rate of change | | Rate of change | | Rheology | | Electrode resistance value | | Ra | |
| | (%) | Evaluation | (%) | Evaluation | mPa·s | Evaluation | (Ω/sq) | Evaluation | μm | Evaluation |
| Example 12 | 27.2 | A | 97.2 | A | 112.3 | B | 108.5 | B | 1.56 | A |
| Example 13 | 26.2 | A | 98.1 | A | 168.5 | B | 104.3 | B | 1.28 | A |
| Example 14 | 27.4 | A | 97.3 | A | 105.2 | B | 105.2 | B | 1.48 | A |
| Example 15 | 29.2 | A | 96.4 | A | 106.3 | B | 111.7 | B | 1.68 | A |
| Example 16 | 55.5 | B | 94.3 | B | 96.3 | A | 115.8 | B | 1.72 | A |
| Example 17 | 54.3 | B | 94.1 | B | 95.4 | A | 119.2 | B | 3.44 | B |
| Example 18 | 49.3 | B | 92.1 | B | 125.3 | B | 104.3 | B | 4.77 | B |
| Example 19 | 56.3 | B | 91.3 | B | 82.0 | A | 149.8 | C | 2.18 | A |
| Example 20 | 55.2 | B | 91.5 | B | 200.5 | C | 119.4 | B | 4.54 | B |
| Example 21 | 60.6 | C | 89.7 | C | 132.3 | B | 117.2 | B | 4.18 | B |

TABLE 4

| | Evaluation | | | | | | | | | |
|---|---|---|---|---|---|---|---|---|---|---|
| | Dispersibility | | | | | Sheet evaluation | | | | |
| | Particle size distribution | | Settling properties | | | | Surface resistance value | | Average surface roughness | |
| | Rate of change | | Rate of change | | Rheology | | Electrode resistance value | | Ra | |
| | (%) | Evaluation | (%) | Evaluation | mPa·s | Evaluation | (Ω/sq) | Evaluation | μm | Evaluation |
| Example 22 | 20.1 | A | 97.2 | A | 82.1 | A | 102.1 | B | 1.96 | A |
| Example 23 | 23.4 | A | 96.3 | A | 101.5 | B | 111.4 | B | 2.33 | A |
| Example 24 | 22.5 | A | 96.6 | A | 105.3 | B | 108.6 | B | 2.42 | A |
| Example 25 | 27.5 | A | 97.5 | A | 125.3 | B | 116.4 | B | 3.81 | B |
| Example 26 | 15.9 | A | 97.2 | A | 91.3 | A | 118.4 | B | 3.45 | B |
| Example 27 | 54.2 | B | 94.5 | B | 95.2 | A | 119.3 | B | 3.80 | B |
| Example 28 | 55.0 | B | 94.3 | B | 90.3 | A | 111.5 | B | 1.83 | A |
| Comparative Example 1 | 103.1 | D | 82.1 | D | 172.3 | B | 135.8 | C | 5.21 | C |
| Comparative Example 2 | 92.3 | D | 86.3 | C | 431.0 | D | 224.5 | D | 9.28 | D |
| Comparative Example 3 | 91.5 | D | 86.5 | C | 123.1 | B | 431.4 | D | 9.54 | D |
| Comparative Example 4 | 107.2 | D | 83.1 | D | 263.2 | C | 142.9 | C | 5.31 | C |
| Comparative Example 5 | 97.2 | D | 87.2 | C | 285.3 | C | 118.4 | B | 7.82 | C |
| Comparative Example 6 | 75.4 | C | 87.4 | C | 234.9 | C | 241.5 | D | 5.45 | C |
| Comparative Example 7 | 134.1 | D | 81.5 | D | 523.5 | D | 290.3 | D | 9.18 | D |
| Comparative Example 8 | 121.2 | D | 82.3 | D | 318.9 | D | 281.5 | D | 10.34 | D |
| Comparative Example 9 | 125.3 | D | 83.2 | D | 421.6 | D | 302.2 | D | 9.54 | D |
| Comparative Example 10 | 82.3 | D | 88.1 | C | 221.2 | C | 144.4 | C | 5.28 | C |
| Comparative Example 11 | 85.7 | D | 86.5 | C | 267.8 | C | 115.3 | B | 5.11 | C |
| Comparative Example 12 | 97.3 | D | 86.3 | C | 280.0 | C | 116.2 | B | 7.43 | C |
| Comparative Example 13 | 97.0 | D | 86.2 | C | 293.3 | C | 117.3 | B | 6.20 | C |

INDUSTRIAL APPLICABILITY

The present invention can provide a carbon material composition excellent in the dispersibility of a fibrous carbon material and capable of reducing electrode resistance.

The invention claimed is:
1. A carbon material composition comprising:
a fibrous carbon material;
a water-based solvent; and
a polyvinyl acetal resin,
the polyvinyl acetal resin having an acetal group content of 40.0 mol % or less and a blockiness of hydrophobic groups measured by NMR of 0.35 or greater and 0.80 or less.
2. The carbon material composition according to claim 1, wherein the polyvinyl acetal resin is an acetalized product of a polyvinyl alcohol resin having a degree of saponification of 70.0 mol % or greater and 99.9 mol % or less.

3. The carbon material composition according to claim 1, wherein the polyvinyl acetal resin has an average degree of polymerization of 200 or greater and 4,000 or less.

4. The carbon material composition according to claim 1, wherein the polyvinyl acetal resin has an acetal group content of 5.0 mol % or more.

5. The carbon material composition according to claim 1, which has a ratio of (A) an amount of the polyvinyl acetal resin to (B) an average fiber diameter of the fibrous carbon material divided by (C) an amount of the fibrous carbon material (A:B/C) of 0.01 or greater and 7.00 or less.

* * * * *